E. E. WAITE.
BUSHING FOR BEARINGS AND METHOD OF MAKING THE SAME.
APPLICATION FILED MAR. 20, 1917.
1,309,668.
Patented July 15, 1919.
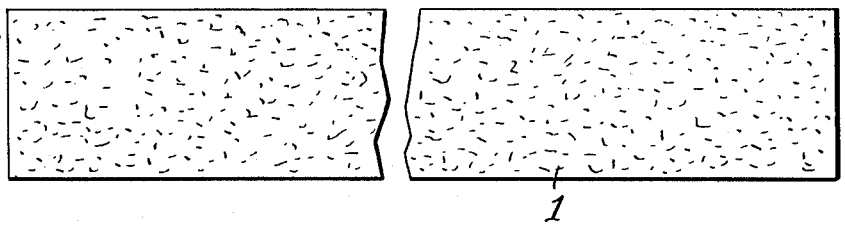
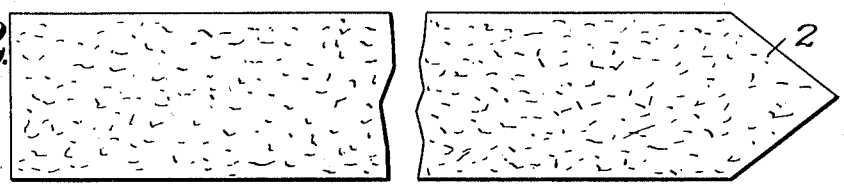
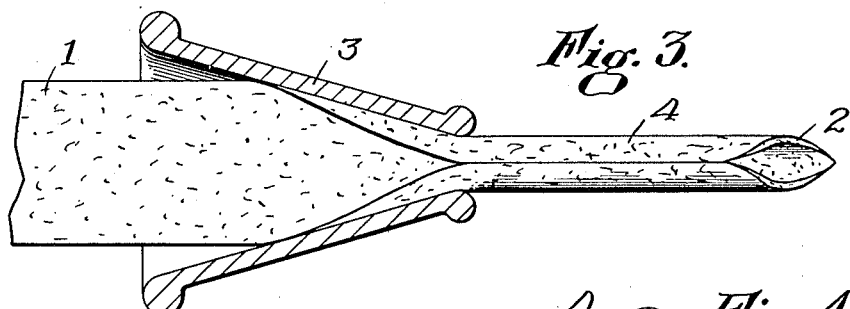
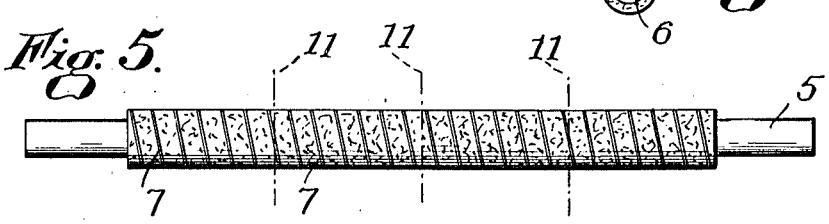
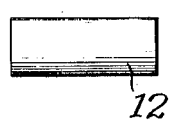
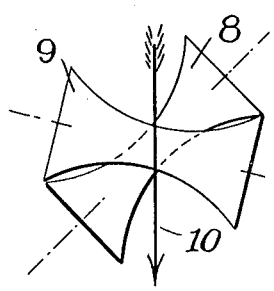
Inventor
Edwin E. Waite.
By Fowler & Kennedy
Attorneys

UNITED STATES PATENT OFFICE.

EDWIN E. WAITE, OF FRAMINGHAM, MASSACHUSETTS.

BUSHING FOR BEARINGS AND METHOD OF MAKING THE SAME.

1,309,668.  Specification of Letters Patent.  Patented July 15, 1919.

Application filed March 20, 1917. Serial No. 156,215.

*To all whom it may concern:*

Be it known that I, EDWIN E. WAITE, of Framingham, in the county of Middlesex and Commonwealth of Massachusetts, have invented a new and useful Improvement in Bushings for Bearings and Methods of Making the Same, of which the following, together with the accompanying drawings, is a specification.

The present invention relates to the manufacture of bearing material, and has particular reference to bushings and linings for bearings. Such bushings and linings are usually made of metals of various kinds, but as is well known, the metals ordinarily used for bushings are incapable of withstanding the high temperatures produced in operation without undergoing changes in physical state which impair their efficiency and give rise to undue wear. Babbitt metal, for instance, becomes soft and melts at a moderately high temperature and all bearing metals expand upon a rise in temperature and tend to seize the journal.

The present invention has for its object the manufacture of a bushing or lining from material adapted to avoid the objections incident to the use of metals for this purpose, the invention residing in the production of a bushing or lining in which a fibrous material, such as asbestos, is employed, instead of metal. The essential features of the improved bushing thus produced, as well as the several steps entering into its production are fully set forth in the following description, reference being had by way of example, to the accompanying drawings illustrating the successive operations in its process of manufacture in which—

Figures 1 and 2 disclose a woven material, from which my improved bushings and linings may be made, the same consisting essentially of asbestos.

Fig. 3 discloses the formation of a strip of such material into a tubular shape, in the process of manufacturing said linings and bushings.

Fig. 4 is an end view of the tubular formation produced by the step illustrated in Fig. 3.

Fig. 5 discloses a subsequent step in my method, concerned with the employment of reinforcing wires for the bushing or lining.

Fig. 6 discloses, diagrammatically, a step concerned with the embedding of said wires in the surface of material.

Fig. 7 discloses a section of the completed bushing or lining.

Like reference characters refer to like parts in the different figures.

In making the material shown in Fig. 1, I prefer to use an asbestos fabric which may be woven from asbestos yarn of the ordinary commercial type; such yarn usually has a small percentage of cotton which acts as a binder for the asbestos fiber, and may also have a wire reinforcement therein to give the yarn the desired tensile strength. A fabric may be woven from such yarn of any desired thickness or width, as required by the size of the bushing or lining to be produced.

Either the fabric so woven, or the yarn from which the fabric is woven is preferably soaked in a compound designed to bind the fibers of asbestos firmly together; such compound may also have the property of giving to the material a lower coefficient of friction. Obviously a great many compounds may be used for this purpose, the particular formula of such a compound depending largely upon the requirements of the finished product.

One compound which produces satisfactory results for general purposes is made by thinning two pounds of saponified Lima oil with a gallon of naphtha and adding about ten per cent. of boiled linseed oil. The saponified Lima oil may be that produced in accordance with United States Patent No. 470,911, granted March 15, 1892; but paraffin may be used instead of this oil or linseed oil may be used alone. A great variety of substances will suggest themselves to those skilled in this art, as suitable for this purpose. If the fabric is first woven before being treated with such a compound, it is desirable to subject it to the action of steam at sufficient pressure, say sixty or seventy pounds, to drive the compound into the body of the fabric. Preferably, however, such a compound is applied to the yarn before it is woven into fabric by running the yarn through a bath of the preparation during the weaving operation. In either case the fabric is caused to become thoroughly impregnated with the compound.

For the production of a bushing or lining of a given size, the fabric is preferably woven in strip form as shown in Figs. 1 and 2, the width of such a strip being determined approximately by the pitch line of the bushing or lining to be produced; that is to say, the width of the woven strip will be 3.1416 times the mean diameter of the bushing. Such a fabric, woven to the proper size and width and impregnated as above described, with a binding compound, either before or after the weaving operation, is then in condition to have a tubular form imparted thereto, and to this end the impregnated strip 1 of Fig. 1 is preferably pointed at one end, as shown at 2, in Fig. 2, to facilitate its being drawn through a former, as hereinafter described.

The former employed may be a trumpet 3, as shown in Fig. 3, the delivery mouth of which corresponds substantially in size to the outside diameter of the bushing or lining to be produced. The strip 1 with pointed end 2 is drawn through the trumpet 3, as shown in Fig. 3, and thereby has imparted thereto a cylindrical form, as shown at 4, in Figs. 3 and 4, the longitudinal edges of the strip being brought together as shown. Thereafter a mandrel 5, Fig. 5, is inserted in the cylinder thus formed, said mandrel snugly fitting the bore 6 thereof. While on the mandrel 5, the cylinder 4 is wound spirally with wire, as shown at 7, Fig. 5, and thereafter the spiral turns of said wire 7 are impressed and embedded in the fabric by submitting the cylinder, with the mandrel 5 preferably telescoped therein, to a rolling action similar to that used for impressing and embedding a wire into a length of hose. To this end an arrangement of coöperating rolls 8 and 9, as shown diagrammatically in Fig. 6, may be employed, said rolls increasing gradually in cross section from their central portions, with their axes intersecting at an acute angle. The cylinder 4, wrapped spirally with the wire 7, and having the mandrel 5 telescoped therein, is passed through the space between such a pair of rolls 8 and 9 in the direction of the arrow 10, Fig. 6, with the result that a rotating motion is given thereto simultaneously with its advancement longitudinally by said rolls. The spiral path thus assumed by any point on the surface of the cylinder follows the spiral lines of the wire 7 wound thereon, so that the pressure of rolls 8 and 9 effects the embedding of wire 7 into the fabric to a sufficient depth below its surface. The presence of the mandrel 5 during this operation prevents the distortion of the cylinder while passing between rolls 8 and 9. After being calendered, the cylinder 4 with the spiral wire 7 embedded below its surface is vulcanized by the slow application of moderate heat thereto, the heat being applied so as not to distil or evaporate the impregnating compound previously used, but to solidify said compound. The degree of heat necessary for the above operation, and also the manner of applying such heat, will be governed almost entirely by the nature of the compound which has been used to impregnate the fabric; some compounds will require more heat than others, to accomplish their solidification, and the manner of applying such heat, so as to minimize the vaporization of the compound is a matter which must be determined, in each case, by those skilled in the art to which the present invention pertains.

After the solidification of the impregnating compound, by the heat treatment above set forth, the cylinder 4 with the spiral wire 7 embedded in its surface has a thick coating of japan applied thereto, of the same general nature and consistency as the japanning which is done on wood. With one or more thick coats of japan on its surfaces, the cylinder 4 is then baked, to harden said coating, and it is to be understood that the mandrel 5, if desired, may be retained within the bore of said cylinder during these operations, for the purpose of preventing distortion. After the coating of japan has been baked thereon, the cylinder is stripped from the mandrel, if the latter has been present, and the cylinder may then be cut into the desired lengths, indicated by the dotted lines 11, Fig. 5, by the use of the elastic abrading wheels, or in any other suitable way, a bushing 12 so produced from the coated and baked cylinder 4 being shown in Fig. 7.

A bushing or lining made as above described could be used without further treatment, but inasmuch as it would absorb a certain quantity of oil when first used, and since it is desirable for many purposes to have a bushing self-lubricating to a certain extent, I prefer to boil the bushing or lining 12 in a suitable lubricant, such as a good machine oil, cylinder oil, or grease, depending upon the use to which the bushing is to be put in practice. Whenever oil or grease is used for this purpose, I prefer to carry the temperature up nearly to the flash point, while the bushing or lining is immersed therein, so that said bushing will be thoroughly saturated with the lubricant. While the bushing or lining, after being japanned and baked, is oil proof in the sense that it is not softened by oil and does not swell or change dimensions substantially, when subject to the action of the oil, still, it has capillary spaces to take up oil when treated in the manner just described. The quantity of oil absorbed in this manner will vary, obviously with the pressure used in the calendering operation.

I have found that bearing linings and bushings made in the manner above described will operate satisfactorily at temperatures which would render permanently useless an ordinary bearing lining or bushing. This property appears to be due to the ability of asbestos to withstand very high temperatures without undergoing any substantial changes in its physical state, and also to the fact that the treatment as above described greatly increases the firmness and mechanical strength of the material. Such bushings and bearings undergo no substantial changes in dimensions or in consistency even at extremely high temperatures produced during their use in operation. There is substantially no tendency toward an increase of friction when bushings and linings of this character, made as above described, become extremely heated in operation, since said bushings do not soften up or become distorted.

I claim,

1. A bushing or lining for bearings, composed of asbestos fabric in tubular form, said fabric having a reinforcing means, and having a coating of japan baked thereon.

2. A bushing or lining for bearings, composed of asbestos fabric in tubular form, having spirally wound reinforcing means embedded in its surface.

3. A bushing or lining for bearings, composed of asbestos fabric in tubular form, having spirally wound reinforcing means embedded in its surface, and a coating of japan baked thereon.

4. A bushing or lining for bearings, composed of asbestos fabric impregnated with a vulcanizable binding compound and vulcanized to solidify said compound, said fabric having a coating of japan baked thereon.

5. A bushing or lining for bearings, composed of asbestos fabric impregnated with a vulcanizable binding compound and vulcanized to solidify said compound, said bushing having spirally wound reinforcing means embedded in its surface.

6. A bushing or lining for bearings, composed of asbestos fabric impregnated with a vulcanizable binding compound and vulcanized to solidify said compound, said bushing having spirally wound reinforcing means embedded in its surface, and having a coating of japan baked thereon.

7. The method of making a bushing or lining for bearings, which consists in impregnating asbestos material with a vulcanizable binder, imparting a tubular formation thereto, and vulcanizing same to silidify the binder.

8. The method of making a bushing or lining for bearings, which consists in impregnating asbestos material with a binder, imparting a tubular formation thereto, and baking a coat of japan thereon.

9. The method of making a bushing or lining for bearings, which consists in impregnating asbestos material with a binder, imparting a tubular formation thereto, and embedding a spirally wound reinforcing means in its surface.

10. The method of making a bushing or lining for bearings, which consists in impregnating asbestos material with a binder, imparting a tubular formation thereto, embedding a spirally wound reinforcing means in its surface, and baking a coat of japan thereon.

11. The method of making a bushing or lining for bearings, which consists in impregnating asbestos material with a vulcanizable binder, imparting a tubular formation thereto, vulcanizing same to solidify the binder, and baking a coat of japan thereon.

12. The method of making a bushing or lining for bearings, which consists in impregnating asbestos material with a vulcanizable binder, imparting a tubular formation thereto, vulcanizing same to solidify the binder, and embedding a spirally wound reinforcing means in its surface.

13. The method of making a bushing or lining for bearings, which consists in impregnating asbestos material with a vulcanizable binder, imparting a tubular formation thereto, vulcanizing same to solidify the binder, embedding a spirally wound reinforcing means in its surface, and baking a coat of japan thereon.

EDWIN E. WAITE.

Witnesses:
H. L. McEntire,
C. C. Gibson.